S. LAKE.
METHOD OF AND APPARATUS FOR WELDING.
APPLICATION FILED DEC. 3, 1919.
1,335,584.
Patented Mar. 30, 1920.
3 SHEETS—SHEET 1.
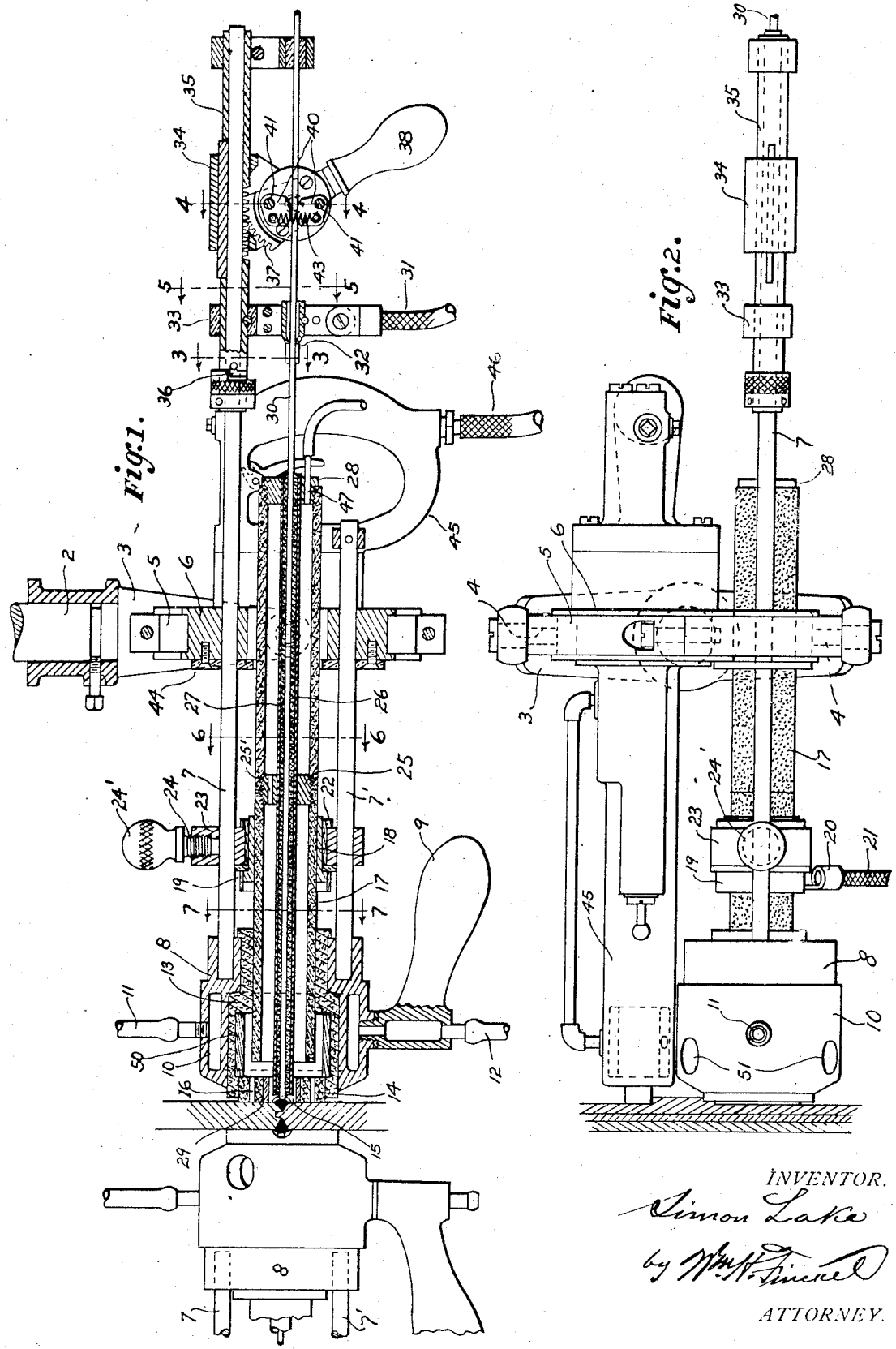
INVENTOR.
Simon Lake
by Wm. H. Pinckney
ATTORNEY.

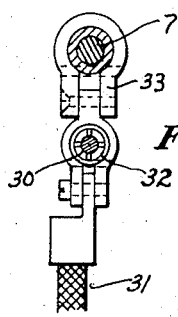
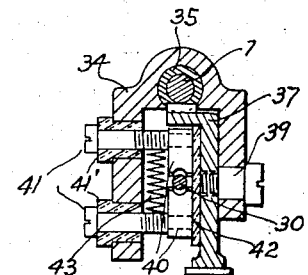
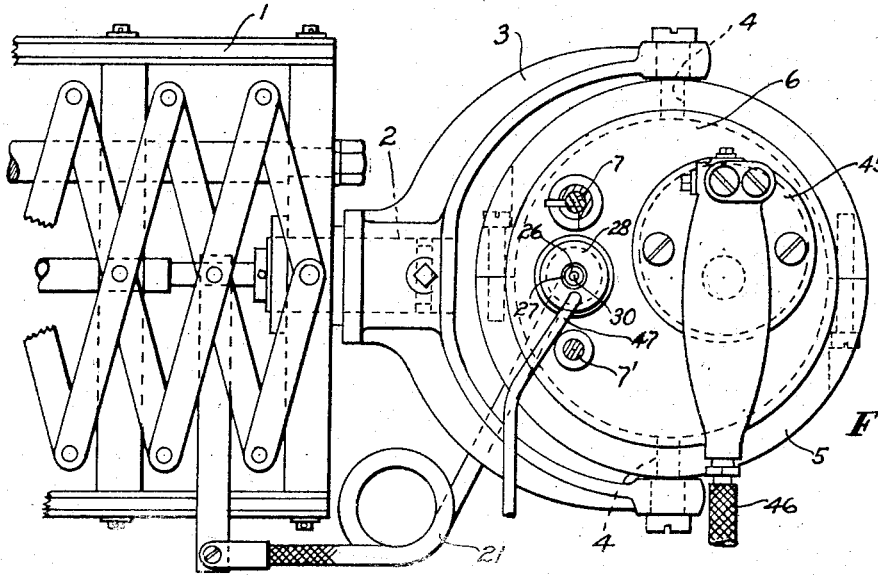
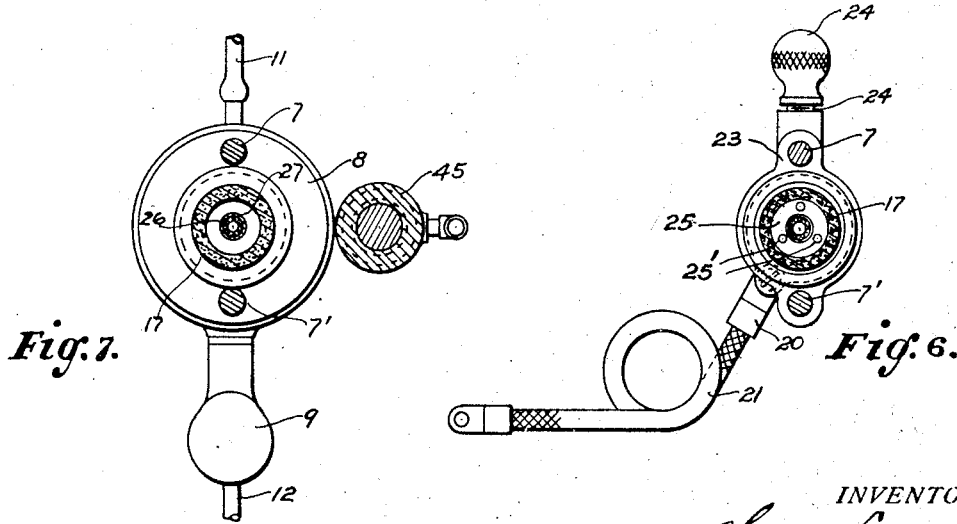

S. LAKE.
METHOD OF AND APPARATUS FOR WELDING.
APPLICATION FILED DEC. 3, 1919.
1,335,584. Patented Mar. 30, 1920.
3 SHEETS—SHEET 3.
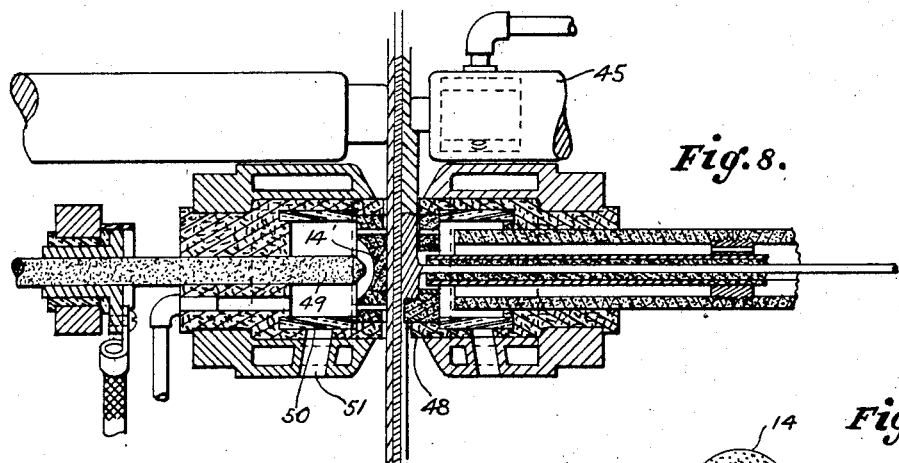
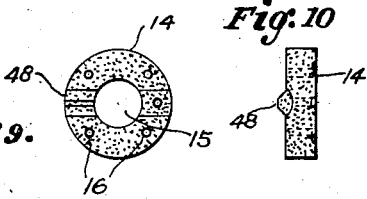
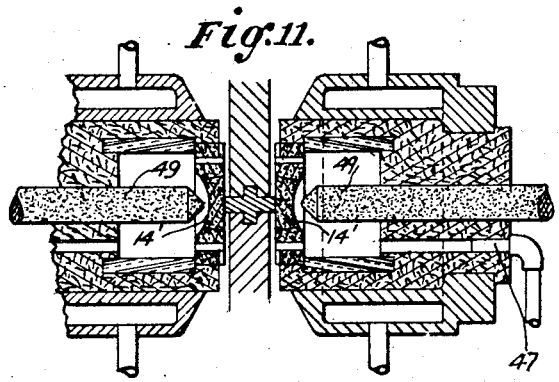
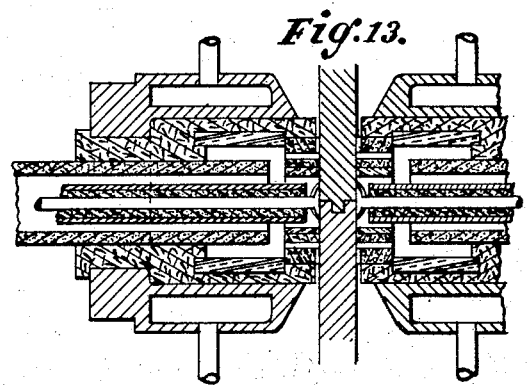
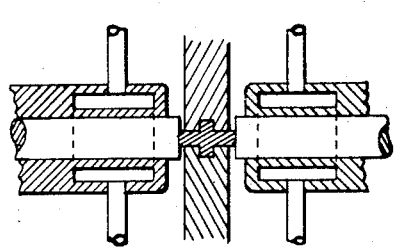
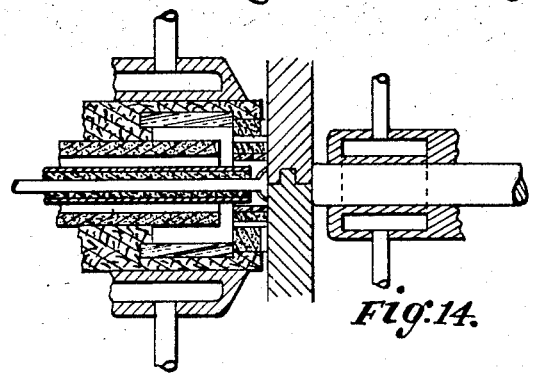
INVENTOR.
Simon Lake
by W. H. Pinnel
ATTORNEY.

UNITED STATES PATENT OFFICE.

SIMON LAKE, OF MILFORD, CONNECTICUT.

METHOD OF AND APPARATUS FOR WELDING.

1,335,584. Specification of Letters Patent. Patented Mar. 30, 1920.

Application filed December 3, 1919. Serial No. 342,128.

*To all whom it may concern:*

Be it known that I, SIMON LAKE, a citizen of the United States, residing at Milford, in the county of New Haven and State of Connecticut, have invented a certain new and useful Improvement in Methods of and Apparatus for Welding, of which the following is a full, clear, and exact description.

This invention relates to a method of and apparatus for welding and more particularly to such a method and apparatus whereby the parts to be welded are heated to a welding temperature, this heating being immediately followed by the application to the parts so heated of pressure, preferably in the form of hammer-like blows, to form a dense, homogeneous weld; and the invention is particularly adapted to the welding together of the plates of hulls of ships, in which connection attention is directed to my Patent No. 1,013,024 granted December 26, 1911.

One object of the invention is to improve upon the known methods of welding to the end that a stronger weld may be obtained than is possible when known methods are used.

Another object of the invention is to provide a welding apparatus which will combine in a single unit a heating element and a pressure applying element so that the two may work in coöperative relation to each other.

Still another object is to provide a device of this character which will combine the steps of heating and hammering in the welding operation so that, in addition to the common practice of merely flowing together the metal of the parts to be welded to form a union thereof, pressure will subsequently be applied to the heated parts to densify the metal at the point of welding and thus produce a joint of greater strength and more homogeneous structure than has heretofore been possible.

Another object is to combine with a device of this character means for supplying and applying a welding medium capable of being incorporated in and of assisting in forming the welded joint.

To these ends the invention consists, broadly, in a method of welding which contemplates the heating of the parts to be welded to a welding temperature, and in the application by pressure to the thus heated parts of a welding medium adapted to be subsequently incorporated by additional pressure into the welded joint and it further consists in a heating element so mounted as to be capable of coöperative adjustment with relation to the parts to be welded, combined with a pressure applying element adapted to apply pressure to the parts and to follow directly in the path of operation of the heating element, and it consists in various details of construction and arrangement of parts as I will proceed now to explain and finally claim.

In the accompanying drawings illustrating the invention, in the several figures of which like parts are similarly designated, Figure 1 is a longitudinal, vertical sectional view of the device showing its application in the welding of plates; Fig. 2 is a plan view; Fig. 3 is a section taken in the plane of line 3—3, Fig. 1; Fig. 4 is a section in the plane of line 4—4, Fig. 1; Fig. 5 is a section in the plane of line 5—5 Fig. 1; Fig. 6 is a section in the plane of line 6—6, Fig. 1; Fig. 7 is a section in the plane of line 7—7, Fig. 1; Fig. 8 is a partial sectional elevation of parts shown in Fig. 1 but taken in a plane at right angles to the plane of section of Fig. 1; Figs. 9 and 10 are, respectively, a plan and an edge view of the heater disk; Fig. 11 shows a modified form of heating elements; Fig. 12 illustrates the application of the pressure elements; Fig. 13 illustrates heater elements of my preferred form in operation on both sides of parts to be welded, and Fig. 14 illustrates the combined operation of a heating element on one side and a pressure element on the other side of parts to be welded.

Referring particularly to Fig. 3, the device of the invention is supported for operation by means of an extensible support or arm 1 of the lazy-tongs variety, the same forming the subject-matter of my application Serial No. 257819, filed October 11, 1918 and allowed September 18, 1919, and this support carries on a swiveling connection 2 a yoke 3 in which in turn is swiveled on pivots 4, a gimbal-ring 5 carrying a gimbal 6. This gimbal carries a pair of longitudinally slidable rods 7, 7' connected at one end to the head 8 of the heating element, and this head is provided with a supporting and guiding handle 9, and is adapted to be water-cooled by means of a jacket 10 and water inlet and outlet connections 11 and 12 respectively.

The interior of the head is provided with a lining 13 of refractory non-electrical-conducting material supporting at its outer end a disk 14 of carbon or other suitable refractory conducting material having a central opening 15 and surrounding passages 16 for a purpose hereinafter appearing. The inner end of the head and lining are of reduced diameter and through a central opening in the lining is inserted an electrode 17 of carbon or other suitable conducting material having a snug, gas-tight, sliding fit in the opening. Current is supplied to the electrode by means of a collar 18 provided with a ring 19 having a terminal 20 to which is attached a lead 21. This collar 18 is fixed on the electrode and coöperating with it but insulated from it by means of a bushing 22 is an adjusting and supporting member 23 slidably mounted upon the rods 7, 7' and capable of fixed adjustment on these rods by means of a set-screw 24.

Within the electrode 17 and supported axially thereof by means of a block 25 provided with ducts 25' and which also acts as a connector for sections of the electrode is a tube 26 which may be formed of either electrical conducting or non-conducting material. If it is of conducting-material it will be provided with a covering 27 of non-conducting, refractory material, such as cement. This tube passes out of electrode 17 through a tight-fitting stopper or end plug 28 which forms a gas-tight closure for the end of the electrode. The inner end of the tube passes into the opening 15 in disk 14 but is insulated therefrom by means of a refractory bushing 29.

Through this tube 26 passes a welding medium 30 such as an iron rod or wire, and to this is electrically connected another lead 31 by a spring or friction clip 32 mounted on an insulating member 33 carried by one of the rods 7. Coöperating with the rod 30 is a feeding device (Figs. 1 and 4) composed of a substantially U-shaped member 34 having a sliding engagement with a toothed sleeve 35 mounted on and locked to rod 7 by a bayonet-lock 36 whereby it may be readily removed from the rod. One arm of member 34 carries a toothed segment 37 provided with an operating handle 38 and pivoted to the arm of member 34 at 39. The other arm of this member carries a pair of eccentric friction clutch members 40, pivoted on screws or the like 41 passing through insulating bushings 41' and forced thereby against a plate 42 of insulating material. These clutch members 40 are drawn toward each other normally by a tension member or spring 43. It will thus be seen that as the handle 38 is moved toward the left (Fig. 1) the clutch members will grip the rod 30 frictionally and advance it into the tube for a purpose later appearing.

In order that the electrode 17 may not contact with gimbal 6 an insulating disk 44 is attached thereto thus keeping the electrode axially located.

The gimbal 6 in addition to supporting the heating element, supports also a pressure applying element 45, preferably an automatic hammer, such as an air hammer, as here shown, having the usual air hose connection 46.

It will thus be seen that these two elements, the heating element and the pressure-applying element are mounted in rigid fixed relation to each other, so that when one is moved, the other will also be moved correspondingly.

Referring particularly to Figs. 1 and 2, the parts to be welded are assembled edge to edge and secured in alinement in any suitable manner, but for the purpose of describing the method of welding with the combination direct arc and indirect arc we will assume that the plates are fairly heavy, tongued and grooved with edges beveled as shown in Fig. 1, thus forming V-shaped grooves on both sides of the plates. In making a weld of this type I may use either the direct current, the single phase alternating current or the three phase alternating current. If using direct current the plates may be connected up to one pole of the generator and the heaters to the opposite pole. It will be understood that the weights of cables, heating element and hammer are carried by the counterbalanced long arm carrier 1 so that the operator is free to rotate and guide the heating element and its attached hammer with very little exertion. To start welding a seam of this kind the disk 14 is brought in contact with the parts to be welded by sliding the rods 7, 7' through the gimbal, the heater moving with the rods. Electrode 17 is then moved forward by means of knob 24' of set-screw 24 until it touches the carbon disk 14 which completes the circuit between the two poles of the generator. The electrode is then withdrawn and adjusted by means of set-screw 24 to form a proper arc between the end of the hollow electrode 17 and the disk 14. This arc rapidly heats the electrode 17 and disk 14 to a white heat and the gases thus generated in what is practically a furnace in the head 8 are driven out through the passages 16 in disk 14 and around the space between tube 26 and the opening 15 in disk 14. If I wish to intensify the heat I admit compressed air, or a mixture under pressure of other well known heating gases such as oxygen or acetylene or hydrogen or other non-oxidizing gas such as nitrogen through inlet 47 thus rapidly heating up an area of the plates the center of heat of which is at about the center of the disk. This may be termed pre-heating of the area surrounding the point to be welded. The portion of tube 26 which extends into the furnace has now become heated to a white heat, and on the welding medium 30 being forced into the V-shaped groove another arc is drawn between it and the plates or parts to be welded and this being a direct arc of intense heat quickly brings the center of the already heated area to a welding heat or even to such heat as to cause it to flow. A rapid forward movement of the handle 38 now moves the rod 30 forward as a ram and drives the plastic or melted metal which is contained in the tube into the V-shaped groove with great force. The impact of the heated metal scours away any oxid which may have been formed by the arc in bringing the metal to a welding heat. The V-shaped projection 48 (Fig. 10) of disk 14 extending into the groove forms a dam past which the liquid metal can not flow and the deposited metal on the other side closes the opposite side, so that, in practice I project sufficient metal to fill a considerable space at one time. The heater is then moved forward following its groove, and successive deposits are made as rapidly as conditions will permit. As soon as the heater is moved forward sufficiently the automatic hammer drives the excess metal which extends above the plates down to a level or flush with the other plate surfaces, thus further compressing the metal and closing all voids if any should exist either in the tongue and groove joint or between the successive charges of metal deposited in the groove.

While I have described a hammer to improve the joint and believe it increases the strength and reliability of the joint, it is obvious that my method of projecting the metal with force and in considerable quantity into the seam produces a much better weld than by the old process, therefore, I wish the hammer to be considered merely as an auxiliary rather than a necessity in making up joints of this type.

In Fig. 1 I have shown two similar heaters acting on opposite sides of the plate, and in such arrangement one pole of the generator will be connected to the plating, and branch wires will connect each of the heaters to the other pole. A multiplicity of heaters may be used if desired with proper rheostats on each to regulate the flow of current.

If the use of single phase alternating current is preferred, one pole may be connected to one heater and the other to the opposite heater, the current passing through the plate. If three phase current is used one phase may be connected to the plate and each of the other phases to the two heaters.

Fig. 8 shows a heater depositing metal into a groove which is formed on only one side of the plate while an indirect arc heater supplies sufficient heat on the opposite side of the seam to bring the plate to a welding heat.

Fig. 11 shows two indirect heaters heating up an area surrounding the point of welding to a welding heat. In this case solid carbons are used for the disk 14 and a readily removable center piece 14' is provided in the disk and opposing the movable carbon 49, for it is obvious that these centers will be consumed quite rapidly by the intense heat. Compressed air or gas is forced into the furnace chamber of the head through an inlet as previously described in connection with the description of the operation of the combination direct-indirect heater shown in Fig. 1. On the metal attaining a welding heat the hammers are brought opposite each other while the metal is still plastic and the weld is hammered as before.

Fig. 12 illustrates the action of two hammers on opposite sides of a joint which is being welded.

Fig. 13 shows two opposing heaters of the direct-indirect type heating up and depositing metals on the opposite faces of a tongue and groove joint, after which operation the joint is hammered together as before.

Fig. 14 shows a section through the center of a direct-indirect heater and in alinement therewith the plunger of a hammer.

It is obvious that it would be of advantage to have the operator able to inspect the interior of the chamber of head 8 in order to see the conditions therein as nearly as may be, and for this purpose I provide the inside of the lining 13 with an annular piece of substantially transparent refractory material 50 with which communicate sight openings 51 formed in the head.

It will be apparent that the apparatus of the invention is susceptible of various embodiments, and I do not hereby intend that I be limited to the specific embodiment shown, as various changes in details of construction and arrangement of parts are permissible within the spirit of the invention and the scope of the claims following.

What I claim is:—

1. A method of welding, consisting in heating the parts to be welded to a welding temperature, and applying by pressure to such parts a welding medium heated to a welding temperature.

2. A method of welding, consisting in heating a restricted area of the parts to be welded to a welding temperature, and applying by pressure to such area a welding medium heated to a welding temperature.

3. A method of welding, consisting in heating a restricted area of the parts to be welded to a welding temperature, and applying by pressure to such area a molten welding medium.

4. A method of welding, consisting in heating a restricted area of the parts to be welded to a welding temperature, and applying by pressure to a portion of said area a welding medium heated to a plastic state.

5. A method of welding, consisting in heating a restricted area of the parts to be welded to a welding temperature, and spraying upon such area a welding medium heated to a welding temperature.

6. A method of welding, consisting in heating a restricted area of the parts to be welded to a welding temperature, and applying under pressure to a delimited portion of such area a welding medium heated to a welding temperature.

7. A method of welding, consisting in heating a restricted area of the parts to be welded to a welding temperature, and spraying upon a delimited portion of such area a molten welding medium.

8. A method of welding, consisting in heating a substantially circular portion of the parts to be welded to a welding temperature, and applying under pressure to the substantial center of such area a welding medium in a plastic state and at a welding temperature.

9. A method of welding, consisting in heating a limited area of the parts to be welded to a welding temperature, applying by pressure to such area a welding medium heated to plasticity, and applying pressure to the parts and medium to form a weld.

10. A method of welding, consisting in heating a limited area of the parts to be welded to a welding temperature, applying thereto under pressure a welding medium heated to a welding temperature, and applying pressure to said parts and medium in a succession of blows to form a weld.

11. A method of welding, consisting in heating a restricted area of the parts to be welded to a welding temperature, applying under pressure to a delimited portion of such area a welding medium heated to plasticity, and hammering said parts and medium to form a weld.

12. A method of welding, consisting in heating a restricted area of the parts to be welded to a welding temperature, spraying a welding medium upon said area, and applying pressure thereto and to said parts to form a weld.

13. A method of welding, consisting in heating a restricted area of the parts to be welded to a welding temperature, spraying upon such area a welding medium, and applying pressure thereto and to said parts to form a weld.

14. A method of welding, consisting in heating a portion of the parts to be welded to a welding temperature, spraying upon a delimited area of the portion so heated a molten welding medium, and hammering said heated portion including the medium to form a weld.

15. A method of welding, consisting in heating an area of the parts to be welded to a welding temperature, projecting by force into this area a welding medium heated to a welding temperature, and applying pressure to the parts and medium to form a weld.

16. A method of welding, consisting in heating a limited area of the parts to be welded to a welding temperature, heating a welding medium to a plastic state, forcibly projecting said plastic medium upon said heated area, and hammering said parts and medium to form a weld.

17. A method of welding, consisting in heating a restricted area of the parts to be welded, heating a portion of a solid welding medium to a plastic state, and projecting said plastic portion of the medium by force exerted upon the solid portion thereof to incorporate the plastic medium with the parts to be welded.

18. A method of welding, consisting in heating a restricted area of the parts to be welded, heating a portion of a solid welding medium to a plastic state, projecting said plastic portion of the medium by force exerted upon the solid portion thereof to incorporate the plastic medium with the parts to be welded, and hammering the thus incorporated parts.

19. In a welding apparatus, the combination with a heating element adapted to heat the parts to be welded, of a pressure element adapted to apply pressure intermittently to the heated parts.

20. In a welding apparatus, the combination with a heating element adapted to heat the parts to be welded, of a pressure element adapted to apply pressure in a succession of blows to the heated parts.

21. In a welding apparatus, the combination with a heating element adapted to produce a welding temperature in the parts to be welded, of a pressure element adapted to strike a succession of hammer blows to the heated parts.

22. In a welding apparatus, the combination with a heating element adapted to heat the parts to be welded, of means for supplying a welding medium to said heating element, and a pressure element adapted to apply pressure to said medium and the heated parts to form a weld.

23. In a welding apparatus, the combination with a heating element adapted to heat the parts to be welded, of means for supplying a welding medium adjacent said heated parts said medium also being heated to welding temperature by said heating element; and a pressure element adjacent said heating element and adapted to apply pressure to the material heated by said heating element.

24. In a welding apparatus, the combination with a heating element adapted to heat an area of the parts to be welded and capable of movement along the joint between the parts, of a pressure element mounted adjacent said heating element and adapted to be moved therewith and capable of applying pressure to the area heated by said heating element.

25. In a welding apparatus, the combination with a heating element adapted to heat the parts to be welded and to supply a molten welding medium, of a pressure applying element adapted to exert pressure upon the medium and heated parts to form a weld.

26. In a welding apparatus, the combination with a heating element adapted for movement in all directions so as to follow the joint to be welded, of a pressure element mounted adjacent said heating element and adapted to move therewith.

27. In a welding apparatus, the combination with a heating element adapted to heat the parts to be welded and capable of movement to follow the line of the joint to be welded, of a pressure element mounted adjacent said heating element and movable therewith and adapted to apply pressure to the parts heated by said heating element.

28. In a welding apparatus, the combination with a movable heating element adapted to heat the parts to be welded and provided with means for supplying a welding medium in molten form, of a pressure element adapted to follow the movement of said heating element and to exert pressure upon the heated parts and the molten medium to form a homogeneous weld.

29. In a welding apparatus, a heating element adjustably supported with relation to the parts to be welded, and a pressure element mounted for movement with said heating element and adapted to follow the operating path of said heating element.

30. In a welding apparatus, a heating element adjustably supported with relation to the parts to be welded, and an automatic hammer mounted for movement with said heating element relative to said parts and adapted to follow the operating path of said heating element.

31. In a welding apparatus, an electric heating element movably mounted with respect to the parts to be welded, and an automatic hammer mounted for movement with said heating element and adapted to follow the operating path thereof.

32. In a welding apparatus, a heating element adapted to heat the parts to be welded and provided with means for supplying a welding medium to said parts.

33. In a welding apparatus, an electric heating element adapted to heat the parts to be welded and including a furnace chamber, and means in said element for supplying a welding medium to said parts.

34. In a welding apparatus, an electric heating element having a pair of electrodes, one of said electrodes supplying a welding medium to the parts to be welded.

35. In a welding apparatus, in combination, a heating element adapted to be moved over the parts to be welded, a furnace chamber in said element adapted to maintain an intense heat, means for projecting said heat upon the parts to be welded to heat them to a welding temperature, means for supplying a welding medium in a molten state to said parts, and a pressure element adapted to travel in the path of said heating element and to apply pressure to said heated parts and molten medium.

36. In a welding apparatus, in combination, a heating element adapted to be moved over the parts to be welded and including a furnace chamber adapted to maintain an intense heat, means for presenting a welding medium to said chamber whereby a portion of said medium is reduced to a molten state, means for simultaneously feeding said medium into position to be subjected to the melting action of the heat in said chamber and for projecting the molten portion of said medium upon parts to be welded, and a pressure applying element so mounted as to follow the path of said heating element and adapted to exert pressure upon the parts to be welded and the welding medium thereupon projected to form a weld.

In testimony whereof I have hereunto set my hand this 1st day of December, A. D. 1919.

SIMON LAKE.

Witnesses:
W. H. FINCKEL, Jr.,
LUCY B. McLAUGHLIN.